June 27, 1944.  V. LEFEBURE  2,352,553
METHOD OF MAKING COMPOSITE BOARD
Filed March 30, 1938
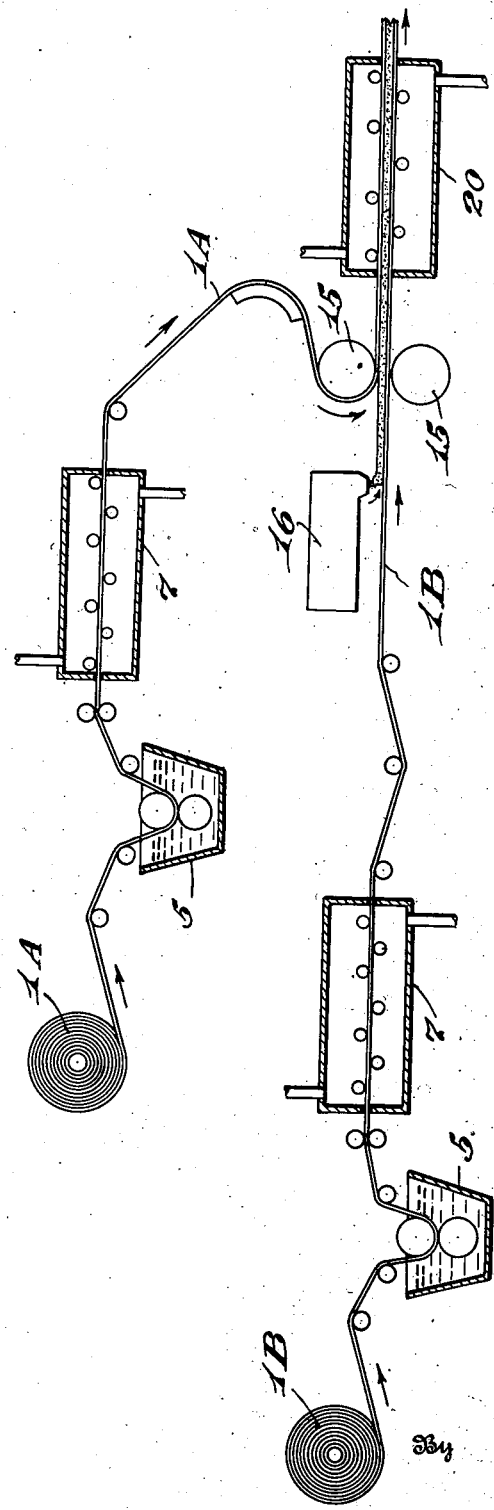
Inventor
Victor Lefebure,
By Roy F. Steward
his Attorney Patented June 27, 1944

2,352,553

UNITED STATES PATENT OFFICE 2,352,553

METHOD OF MAKING COMPOSITE BOARDS

Victor Lefebure, London, England, assignor to Imperial Chemical Industries Limited, a corporation of Great Britain Application March 30, 1938, Serial No. 199,004 In Great Britain April 2, 1938

13 Claims. (Cl. 154—2)

This invention relates to composite building boards comprising a relatively thin fibre board covering bonded to one or both sides of a core of plaster, cement or other suitable material, and in particular to composite building boards having a decorated surface on one or both sides.

At present decorated composite building boards of the kind described are made by superimposing a decorative film or layer upon the fibre board covering, with or without the subsequent application of lacquer or varnish.

Such decorated board, however, is easily damaged and it has only a low resistance to water, so that the decorative appearance can only be preserved by careful handling and use of the board.

This invention has as an object to provide a decorative plaster board, whose decorative surface is not easily damaged. A further object is to provide such a board which is resistant to water. A further object is to provide such a board which has enhanced strength. A still further object is to devise methods of manufacturing such boards. Further objects will appear hereinafter.

These objects are accomplished by the following invention.

I have found that an absorbent pulp or fibre board of the type used as a liner of a plasterboard can be impregnated with an aqueous urea-formaldehyde or thiourea-formaldehyde resin syrup, and that the impregnated liner can be dried or partially dried, under conditions leaving the resin-materal still uncured or unset, and then passed through the plasterboard-forming process in the ordinary way; the essential bond with the setting calcium sulphate core being not only unimpaired when proceeding in this manner, but even substantially improved. The undried formed board can then be passed through the plasterboard drier, and in the ensuing operation of drying under the usual conditions prevailing in a plasterboard drier, which drying will proceed at the normal rate, the resin material with which the liner is impregnated acquires, in passing through such drier, those irreversible properties of a set resin which are acquired in the final product.

According to this invention, therefore, the first step in making the plasterboard is to impregnate a liner with the resin syrup. However, this leaves the liner wet and so exceedingly weak that its tensile strength is much too low to permit feeding it, in this condition, through the usual continuous plasterboard machine. Accordingly, in order to restore its tensile strength sufficiently, the impregnated liner is then dried but is not heated sufficiently for the resin to harden into its irreversible condition. This leaves the liner in appearance, feel and flexibility almost indistinguishable from its condition before impregnation. This liner is then used in the ordinary manner for making up plasterboard, by placing it in contact with a wet plaster core, the green board thus formed is passed in the usual manner to a plasterboard drier and the heat of the drier causes the resin to set in its irreversible form.

The invention is illustrated but not limited by the following examples.

Example I

A white board known as boxboard (having a water-absorption of 120% after immersion in water at 30° C. for three minutes) was impregnated on one side with a 60% solution of resin syrup, containing 1½ molecular proportions of formaldehyde to 1 molecular proportion of urea, and catalysed with 0.1% sulphuric acid. The paper was dried under conditions leaving the resin material uncured.

The dried paper was used to make three-eighth inch plasterboard, with a core mix consisting of:

| | Parts |
|---|---|
| Plaster of Paris | 100 |
| Sawdust | 10 |
| Water | 55 |

The plasterboard was made in an ordinary plasterboard plant, the resin-impregnated paper being used as a liner for both sides. The green board was dried by passing through a drier whose inlet temperature was 150° C. and whose outlet temperature was 65° C., the drying time being 1½ hours. The board was then ironed on both sides at 140° C. for two minutes. The resultant board was abraded and buffed on the surface, which was intended to be decorative, and yielded an excellent gloss surface. The impregnation of the back liner gave equal tension on each face, which contributes to the strength, and extra water-resistance.

Example II

A white boxboard as used in Example I impregnated as in Example I but in this case was made up into plasterboard with the following core mix:

| | Parts |
|---|---|
| Plaster of Paris | 100 |
| Sawdust | 10 |
| Resin syrup | 15 |
| Water | 55 |

The proportion of resin to water in the syrup was 1:1.

The plasterboard was made in an ordinary plasterboard plant, and was dried by passing through a drier whose inlet temperature was 150°

C. and whose outlet temperature was 65° C. The drying time was 1½ hours.

The resulting board showed exceptional water-resistance.

The plaster mix used for the core in making these boards can be of any type known in the plasterboard art, but a core of special value is one in which a urea formaldehyde resin syrup is employed in the core mix also, in order to modify, harden and strengthen the plaster, as in Example II. Such core has the special benefit of very high water-resistance, good cutting qualities for accurate shaping, higher strength and reinforcement of bond with the liner.

The decorative effect which is imparted to the fibre board covering may be either plain or ornamental. For example, coloured effects may be obtained by incorporating a suitable dye or pigment in the liner. To obtain printed effects the fibre board covering may be printed, e. g. by methods of the photogravure type, preferably with inks which penetrate relatively deeply into the covering. Embossed effects may also be given to the fibre board covering, preferably after impregnation.

The bonding of the impregnated fibre board covering with the core of the composite board, which is made from a water-setting plaster, cement or the like, may follow the standard practice in the composite building board art. Thus the material of the core is allowed to set while in contact with the fibre board covering or coverings and is subsequently dried. With some resins, a board with a glossy surface is directly obtained. If desired, the resin containing surface may be polished with the aid of suitable abrasives, or the board may be given a short heat and pressure treatment, e. g., in a multiple platen press, in order to compact and level the surface as well as to impart a higher gloss. Hot rolling or ironing may also be adopted for this purpose.

The resin syrups suitable for use in practicing the novel process may be either aqueous solutions of urea (or thio-urea) and formaldehyde, or syrups of the reaction product of urea (or thio-urea) and formaldehyde in an aqueous medium. I prefer to use syrups lying in the range of molecular composition between 2 molecules of formaldehyde:1 molecule of urea and 1 molecule of formaldehyde:1 molecule of urea. Syrups lying outside this range can be used, but ordinarily with less advantage. I can use syrups containing any quantity of the resin until the viscosity becomes so great as to prevent ready impregnation. This occurs at about 60% concentrations in the cold but, by heating, stronger solutions can be used. I have found syrups containing 40% most useful.

Any of the usual catalysts to promote the solidification of the resin can be used, such as sulphuric acid, hydrochloric acid, trichlor-acetic acid, phosphoric acid and the like.

The resin in the board, in contact with the core, can be cured to an irreversible condition by the heating conditions of the plasterboard drier, i. e., averaging about 100° C. (drier temperature) for 1½ to 2 hours. Higher temperatures require shorter times but temperature must not be so high as to allow surface charring—say 200° C. At temperature lower than 60° C. very long periods over 24 hours are required.

The accompanying drawings illustrate more or less diagrammatically one form of apparatus suitable for use in practicing the invention. Top liner 1A and bottom liner 1B are fed into and through their respective impregnating troughs 6, in which they are impregnated with aqueous resin in syrup, passing thence through drying chambers 7 wherein they are dried or partially dried at a temperature below that of resinification. The impregnated liners then pass to the spaced master rolls 15 of an ordinary type of continuous plasterboard machine which press the liners onto a layer or core of wet unset plaster mix which is applied between the liners by the plaster mixer 16. The resultant wet formed board passes from the master rolls through the usual plasterboard drier 20 which is operated under conditions normal to ordinary plasterboard manufacture.

As liners, any of the pulp boards or fibre boards used in making ordinary plasterboard can be used for the purposes of this invention, but we prefer to use a highly-absorptive one, such as, for instance, the board known to the trade as boxboard and woodpulp board. The boards which will take up from 70 to 120% of their weight of water after three minutes' immersion are especially suitable.

The final board is superior to hitherto-known decorated boards of the plasterboard type, inasmuch as the surface resistance of the decorated covering is much greater, and the decoration penetrates relatively deeply into the covering, so that accidental cutting or abrasion down to a depth of as much as one-thirty second of an inch may occur without seriously impairing the decorative effect. The resin-impregnated coverings are also much stronger than those of standard plasterboard. For example, employing urea-formaldehyde and thiourea-formaldehyde resins in the manner herein disclosed, the hardness and strength of the coverings approach those of pressed, cured, laminated products.

As an example to show the water-resistant effect, a sheet of ordinary plasterboard was immersed in water for four hours. It was then taken out and weighed, and was found to have absorbed 50% of its weight of water. A plasterboard made up with resin-impregnated liners in accordance with this invention was also immersed for four hours and then taken out and weighed, and in this case the water-absorption was only 15%. A third board, manufactured according to the method described in Example II showed an absorption of water of only 7%.

As many apparently widely different embodiments of this invention may be made without departing from the spirit and scope thereof, it is to be understood that the invention is not limited except as defined in the appended claims.

I claim:

1. A method of manufacturing composite board such as plasterboard which comprises continuously forming the board by contacting a layer of unset water-setting cementitious material with substantially dry liners of fibrous material of sufficient strength to withstand the tension applied in forming the board on a continuous plasterboard machine and allowing said layer of cementitious material to set while in contact on both sides with said liners, at least one of which liners has been impregnated with an aqueous resin syrup containing an acid catalyst and belonging to the class consisting of urea-formaldehyde and thiourea-formaldehyde resin syrups, and subjecting the formed board to drying by passage through a drier having an inlet temperature of about 150° C. and an outlet temperature of about 65° C. for a period of the order of 1½-2 hours to dry the formed board and cure the resin.

2. A method as set forth in claim 1, in which the formed board is dried at an average temperature of about 100° C. for a period of 1½ to 2 hours.

3. A method as set forth in claim 1, in which the resin-containing surface of the dried board is subjected to a short heat and pressure treatment.

4. A method as set forth in claim 1, in which the resin-containing surface of the dried board is subjected to hot rolling.

5. A method as set forth in claim 1, in which the resin-containing surface of the dried board is subjected to hot ironing.

6. A method of manufacturing composite board such as plaster board which comprises continuously forming the board by contacting a layer of unset calcium sulphate plaster with substantially dry liners of fibrous material of sufficient strength to withstand the tension applied in forming the board on a continuous plasterboard machine and allowing said layer of plaster to set while in contact on both sides with said liners, at least one of which liners has been impregnated with an aqueous resin syrup containing an acid catalyst and belonging to the class consisting of urea-formaldehyde and thiourea-formaldehyde resin syrups, and subjecting the formed board to drying by passage through a drier having an inlet temperature of about 150° C. and an outlet temperature of about 65° C. for a period of the order of 1½-2 hours to dry the formed board and cure the resin.

7. A method of manufacturing composite board such as plasterboard which comprises continuously forming the board by contacting a layer of unset water-setting cementitious material with substantially dry liners of fibrous material of sufficient strength to withstand the tension applied in forming the board on a continuous plasterboard machine and allowing said layer of cementitious material to set while in contact on both sides with said liners, at least one of which liners has been impregnated with an aqueous urea-formaldehyde resin syrup containing an acid catalyst and containing between one and two molecular proportions of formaldehyde for each molecular proportion of urea, and subjecting the formed board to drying by passage through a drier having an inlet temperature of about 150° C. and an outlet temperature of about 65° C. for a period of the order of 1½-2 hours to dry the formed board and cure the resin.

8. A method of manufacturing composite board such as plasterboard which comprises continuously forming the board by contacting a layer of unset calcium sulphate plaster containing a proportion of urea-formaldehyde resin syrup with substantially dry liners of fibrous material of sufficient strength to withstand the tension applied in forming the board on a continuous plasterboard machine and allowing said layer of plaster to set while in contact on both sides with said liners, at least one of which liners has been impregnated with an aqueous resin syrup containing an acid catalyst and belonging to the class consisting of urea-formaldehyde and thiourea-formaldehyde resin syrups, and subjecting the formed board to drying by passage through a drier having an inlet temperature of about 150° C. and an outlet temperature of about 65° C. for a period of the order of 1½-2 hours to dry the formed board and cure the resin.

9. A method of manufacturing composite board such as plasterboard which comprises impregnating a fibrous sheet liner material with an aqueous resin syrup of the class consisting of urea-formaldehyde and thiourea-formaldehyde resin syrups, said resin syrup containing an acid catalyst, drying said impregnated liner material at a low temperature insufficient to cure the resin, continuously forming the board by bringing the dried impregnated linear material into contact with a layer of cementitious material in the unset plastic state, allowing said cementitious material to set while in contact with said impregnated liner material, and subjecting the formed board to drying by passage through a drier having an inlet temperature of about 150° C. and an outlet temperature of about 65° C. for a period of the order of 1½-2 hours to dry the formed board and cure the resin.

10. A method of manufacturing composite board, such as plasterboard, of the type which consists of a layer of cementitious material with at least one liner of fibrous material adhering thereto, which comprises continuously forming the board by assembling a layer of unset cementitious material with a substantially dry liner of fibrous material, which has been impregnated with an aqueous resin syrup containing an acid catalyst and belonging to the class consisting of urea-formaldehyde and thiourea-formaldehyde resin syrups, of sufficient strength to withstand the tension applied in forming the board on a continuous plasterboard machine, and subjecting the formed board to drying by passage through a drier having an inlet temperature of about 150° C. and an outlet temperature of about 65° C. for a period of the order of 1½-2 hours to dry the formed board and cure the resin.

11. A method of manufacturing composite board such as plasterboard which comprises impregnating a fibrous sheet liner material with an aqueous resin syrup of the class consisting of urea-formaldehyde and thiourea-formaldehyde resin syrups, said resin syrup containing an acid catalyst, drying said impregnated liner material at a low temperature to drive off enough water to increase the strength of the impregnated material sufficiently to enable it to withstand the tension to which it is subjected in a plasterboard machine while leaving the resin in the uncured condition, continuously forming a plasterboard by bringing the dried impregnated liner material into contact with a layer of unset calcium sulphate plaster in the plastic state, allowing said plaster to set while in contact with said impregnated liner material, and subjecting the resulting board to drying by passage through a drier having an inlet temperature of about 150° C. and an outlet temperature of about 65° C. for a period of the order of 1½-2 hours to dry the formed board and cure the resin.

12. A method of manufacturing a water-resistant plasterboard having a hard surface capable of being abraded and polished which comprises impregnating a fibrous sheet liner material with an aqueous resin syrup of the class consisting of acid-catalysed urea-formaldehyde and thiourea-formaldehyde syrups, drying said impregnated liner material at a low temperature to drive off enough water to increase the strength of the impregnated material sufficiently to enable it to withstand the tension to which it is subjected on a continuous plasterboard machine while leaving the resin in the uncured condition, continuously forming a plasterboard by bringing the dried impregnated material into contact with a layer of unset calcium sulphate plaster in the plastic state, allowing said plaster to set while in contact with said impregnated liner material, and subjecting the resulting board to drying by passage through a drier having an inlet temperature of about 150° C. and an outlet temperature of about 65° C. for a period of the order of 1½-2 hours to dry the formed board and cure the resin impregnated in the liners through the plaster core.

13. A method of manufacturing a water-resistant plasterboard having a hard surface capable of being abraded and polished which comprises impregnating a fibrous sheet liner material with an aqueous resin syrup of the class consisting of acid-catalysed urea-formaldehyde and thiourea-formaldehyde syrups, drying said impregnated liner material at a low temperature to drive off enough water to increase the strength of the impregnated material sufficiently to enable it to withstand the tension to which it is subjected on a continuous plasterboard machine while leaving the resin in the uncured condition, mixing an aqueous syrup of the class consisting of acid-catalysed urea-formaldehyde and thiourea-formaldehyde resin syrups with calcium sulphate plaster before setting, continuously forming a plasterboard by bringing the dried impregnated liner material into contact with a layer of said calcium sulphate plaster mixture in the plastic state, allowing said layer of plaster mixture to set while in contact with said impregnated liner material, and subjecting the resulting board to drying by passage through a drier having an inlet temperature of about 150° C. and an outlet temperature of about 65° C. for a period of the order of 1½-2 hours to dry the formed board and to cure the resin in the liner material and in the plaster mixture.

VICTOR LEFEBURE.